US008327831B2

(12) United States Patent
Sturman

(10) Patent No.: US 8,327,831 B2
(45) Date of Patent: Dec. 11, 2012

(54) DUAL FUEL COMPRESSION IGNITION ENGINES AND METHODS

(75) Inventor: Oded Eddie Sturman, Woodland Park, CO (US)

(73) Assignee: Sturman Digital Systems, LLC, Woodland Park, CO (US)

( * ) Notice: Subject to any disclaimer, the term of this patent is extended or adjusted under 35 U.S.C. 154(b) by 394 days.

(21) Appl. No.: 12/721,270

(22) Filed: Mar. 10, 2010

(65) Prior Publication Data

US 2010/0229838 A1    Sep. 16, 2010

Related U.S. Application Data

(60) Provisional application No. 61/159,031, filed on Mar. 10, 2009.

(51) Int. Cl.
*F02M 21/02* (2006.01)

(52) U.S. Cl. ... 123/525; 123/79 C; 123/575; 123/568.14

(58) Field of Classification Search ............... 123/1 A, 123/3, 26, 296, 299, 304, 470, 525, 526, 123/527, 543, 544, 568.14, 575, 79 C, 62, 123/66, 70 R
See application file for complete search history.

(56) References Cited

U.S. PATENT DOCUMENTS

| 3,881,459 | A | * | 5/1975 | Gaetcke | ...... 123/188.1 |
| 4,275,698 | A | * | 6/1981 | Dennetiere | ...... 123/527 |
| 4,957,073 | A | | 9/1990 | Bergeron | |
| 5,228,423 | A | * | 7/1993 | Oikawa et al. | ...... 123/525 |
| 5,357,914 | A | | 10/1994 | Huff | |
| 5,617,835 | A | | 4/1997 | Awarzamani et al. | |
| 5,782,215 | A | * | 7/1998 | Engelmann | ...... 123/79 C |
| 6,415,749 | B1 | | 7/2002 | Sturman et al. | |
| 6,739,293 | B2 | | 5/2004 | Turner et al. | |
| 7,188,587 | B1 | | 3/2007 | Quader et al. | |
| 2007/0245982 | A1 | | 10/2007 | Sturman | |
| 2008/0264393 | A1 | | 10/2008 | Sturman | |
| 2009/0183699 | A1 | | 7/2009 | Sturman | |

FOREIGN PATENT DOCUMENTS

| EP | 0726385 | 8/1996 |
| EP | 1174608 | 1/2002 |
| EP | 1728995 | 12/2006 |
| GB | 2402169 | 12/2004 |

OTHER PUBLICATIONS

"International Search Report and Written Opinion of the International Searching Authorit Dated Feb. 2, 2011", International Application No. PCT/US2010/026874.

(Continued)

*Primary Examiner* — Noah Kamen
*Assistant Examiner* — Hung Q Nguyen
(74) *Attorney, Agent, or Firm* — Blakely Sokoloff Taylor & Zafman LLP

(57) ABSTRACT

Dual fuel compression ignition engines and methods that allow compression ignition on gaseous fuels like compressed natural gas, hydrogen and ammonia, yet will run on liquid fuels, including diesel fuels for such purposes as starting or when the gaseous fuel is not available or has been consumed and greater range or operating time is needed. Ignition of fuels having a high self ignition temperature is assured by recirculating high temperature exhaust gas back into the intake charge before compression. Existing engines may be converted to run as a dual fuel engine by replacement of the engine head or heads. Various embodiments are disclosed.

24 Claims, 4 Drawing Sheets

OTHER PUBLICATIONS

Schechter, Michael M., "New Cycles for Automobile Engines" *SAE Technical Paper Series, Society of Automotive Engineers*, 1999-01-0623, (Mar. 1, 1999), pp. 1-10.

Agosta, Vito, "The Ammonia Economy, There is an alternative to a hydrogen future.", http://www.memagazine.org/contents/current/webonly/webex710.html, (Jul. 10, 2003).

Green Car Congress, "Hydrogen Engine Center Building Ammonia-Fueled System", http://www.greencarcongress.com/2006/09/hydrogen_engine.html, (Sep. 19, 2006).

Jensen, Scott, "Converting Diesel Engines to Dual Fuel, The Pros and Cons of Common Gas Engine Types", (Jan. 12, 2006), pp. 1-3.

The European Natural Gas Vehicle Association, "Dual Fuel (Natural Gas/Diesel) Engines: Operation, Applications & Contribution" *42nd GRPE*, May 28-31, 2001, *agenda item 4*, Informal document No. 18, Submitted to the Group of Experts on Pollution & Energy (GRPE) as an Informal Document May 2001.

Voxsolaris: The Voice of the Sun, "Driving on Ammonia: Critique of Ammonia Fueled IC Engines", http://voxsolaris.com/nh3driver.html.

Wang, Homer, "conceptual power-added ammonia-fueled internal combustion engines", *Ammonia—Sustainable, Emission Free Fuel*, Oct. 15 & 16, 2007 Presentations, San Francisco, CA, (Oct. 15, 2007).

"Invitation to Pay Additional Fees/Communication Relating to the Results of the Partial International Search Dated Jul. 23, 2010", International Application No. PCT/US2010/026874.

\* cited by examiner

DUAL FUEL COMPRESSION IGNITION ENGINES AND METHODS

CROSS-REFERENCE TO RELATED APPLICATION

This application claims the benefit of U.S. Provisional Patent Application No. 61/159,031 filed Mar. 10, 2009.

BACKGROUND OF THE INVENTION

1. Field of the Invention

The present invention relates to the field of compression ignition engines.

2. Prior Art

Dual fuel compression ignition engines are well known in the prior art. Most commonly, such engines operate on a dual fuel consisting of diesel fuel and natural gas. The combination of a liquid fuel and a gaseous fuel had an advantage in the prior art in that diesel fuel could be injected in controlled amounts through a conventional diesel injector, and the gaseous fuel could be injected into the intake airstream. Typically such engines depend on the use of some diesel fuel to initiate compression ignition, with the gaseous fuel then supplementing the diesel fuel for increased power. Such engines frequently run on 100% diesel fuel at idle, with increasing amounts of gaseous fuel being included as the power requirements of the engine increase until running on perhaps 80% gaseous fuel at full power.

Diesel fuel is used with the gaseous fuel to obtain compression ignition, as the engines used were otherwise conventional diesel engines with no way to control compression ignition of the gaseous fuel by itself. However the use of injected diesel fuel for compression ignition worked satisfactorily, in that the self ignition temperature of the gaseous fuel typically is too high to self ignite in a conventional diesel engine, and further, if self ignition could be obtained, there would be no way to control the time of ignition, unless the gaseous fuel was injected into the combustion chamber at the appropriate time, rather than being mixed with the intake air.

A primary gaseous fuel of interest in the United States and many other places is natural gas, as it is plentiful and inexpensive. However natural gas has the disadvantage of not being liquifyable at ordinary temperatures, though does turn to a liquid at cryogenic temperatures. The use of a fuel that must be maintained at cryogenic temperatures in ordinary vehicles, such as passenger cars and trucks, is not practical. Accordingly for such use, natural gas must be stored in pressurized form, highly limiting the energy per unit of volume (energy density) of the compressed natural gas. Thus when used to power a vehicle, alone with spark ignition or in conjunction with sufficient diesel fuel for compression ignition in motor vehicles, the range of the vehicle is highly limited. Consequently such dual fuel engines are operated solely on diesel fuel, when necessary, when the compressed natural gas is fully used.

In U.S. Patent Application Publication No. 2007/0245982 published Oct. 25, 2007 and entitled "Low Emission High Performance Engines, Multiple Cylinder Engines and Operating Methods", compression ignition engines and methods of operating compression ignition engines are disclosed which include, among other things, an engine operating cycle for use in camless engines whereby diesel fuel is injected into the combustion chamber early in the compression stroke without a conventional air intake stroke. Ignition temperatures are limited by a very limited air content in the combustion chamber, with additional air being injected after ignition to continue combustion to completely consume the fuel, and provide enough excess air (with or without some additional air intake) in the residual exhaust gas for the following combustion ignition while still limiting combustion chamber temperatures to below the temperature at which $NO_X$ is formed. The time of compression ignition is controlled by engine valve control, with cycle to cycle adjustments being made based on the time of ignition during the previous cycle. This operating cycle has a number of advantages for diesel fuel, including the advantage of fully vaporizing the diesel fuel in hot exhaust gases before combustion to avoid both hot spots and droplets that do not fully burn.

DETAILED DESCRIPTION OF THE PREFERRED EMBODIMENTS

The present invention is intended for use in camless engines wherein an electronic control system has control of engine valve timing and fuel injection. Such engine valve control systems may use hydraulic valve actuation, such as is disclosed in U.S. Pat. No. 6,739,293, though other engine valve control systems may be used. Camless engines wherein an electronic control system has control of engine valve timing and fuel injection include free piston engines, which have neither a camshaft nor a crankshaft coupled to the free pistons.

Figure 1:
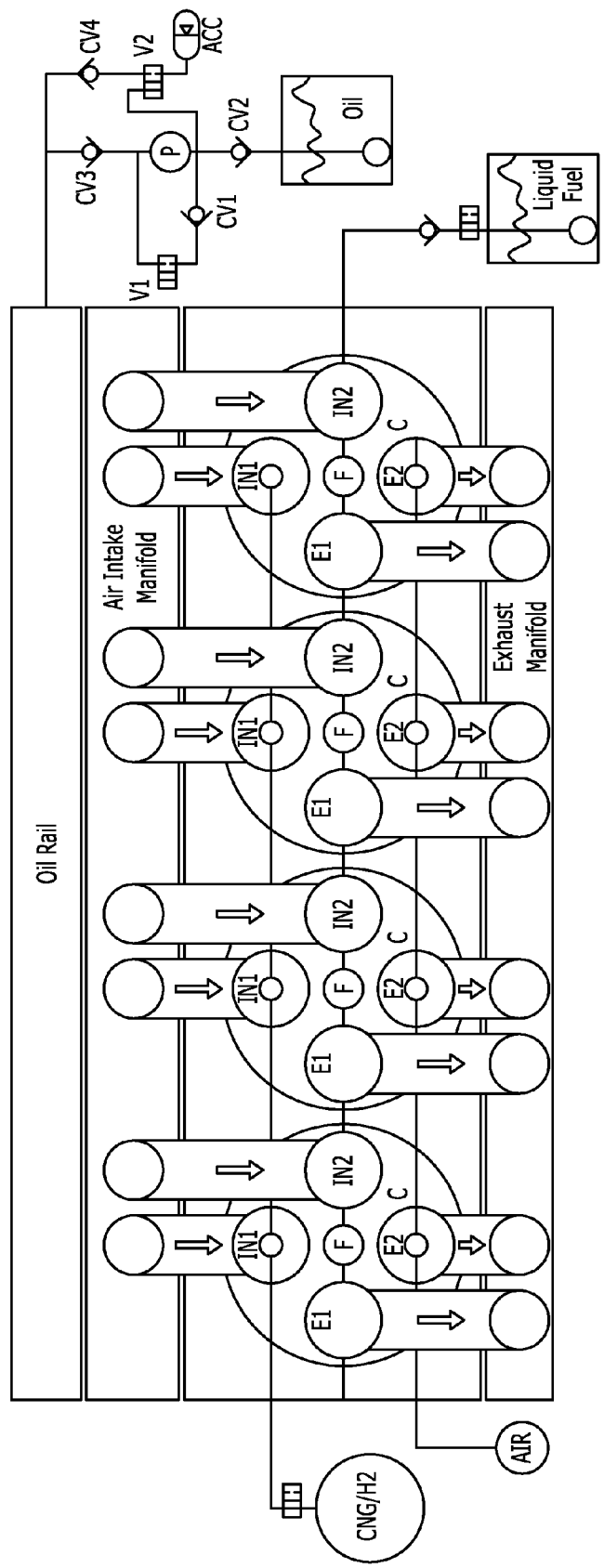
FIG. 1 is a plan view illustrating an exemplary engine head configuration in accordance with the present invention.

FIG. 1 is a diagram illustrating a typical four cylinder engine, or alternatively, one bank of a V8 diesel engine. In the engine illustrated, all cylinders have the same configuration, though this is not a limitation of the invention. In particular, in the embodiment of FIG. 1, each cylinder C has two intake valves IN1 and IN2 and two exhaust valves E1 and E2. In addition, each cylinder has a fuel injector F which may of conventional design for compression ignition engines, though preferably is electronically controllable. The four cylinders also have associated therewith an oil rail, which in the embodiment disclosed is used both for supplying actuating oil to the hydraulic valve actuating system and for the injectors, typically intensifier type injectors (the connection of the oil rail to the fuel injectors being well known, but not being shown so as to not clutter the Figure). Also associated with all four cylinders is an air intake manifold which may be supplied through a turbocharger (also not shown) and an exhaust manifold which may be used to power the turbocharger.

Figure 2:
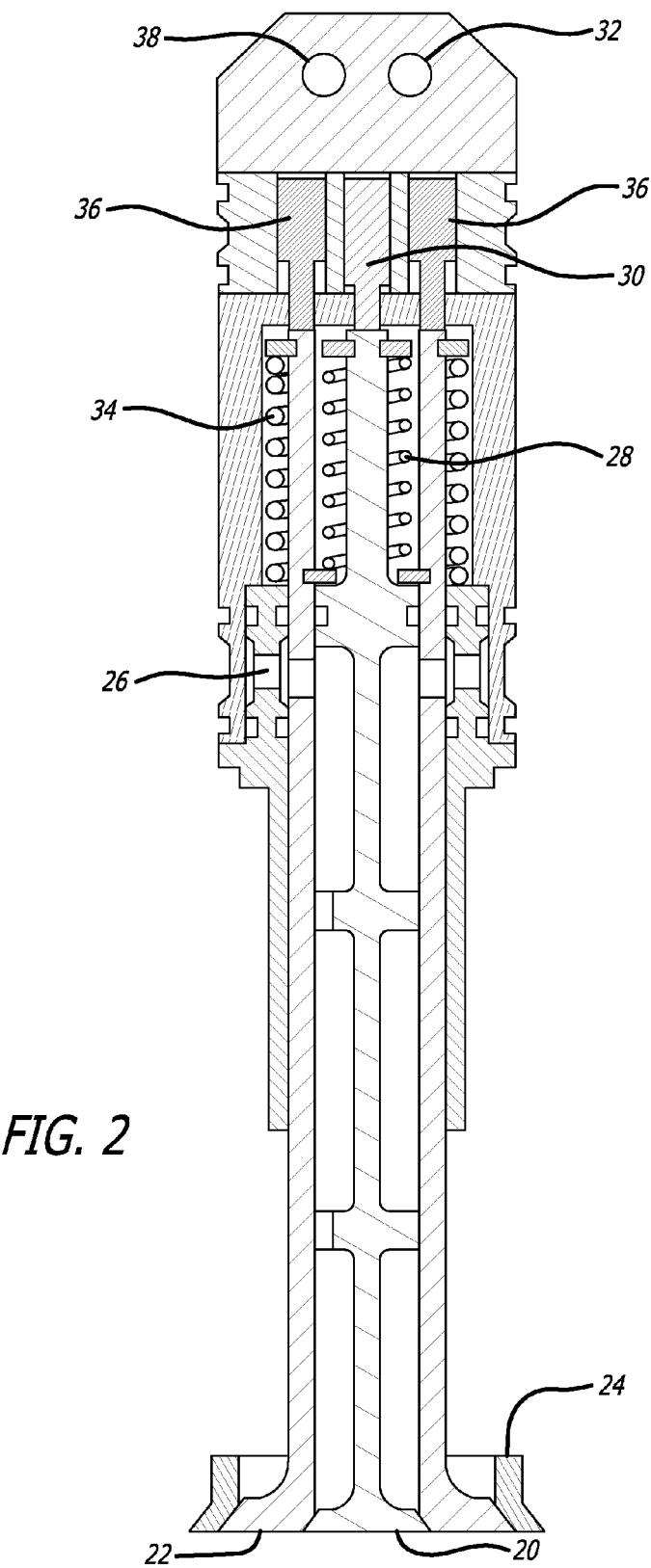
FIG. 2 is a cross section of an exemplary construction of a poppet valve within a poppet valve.

In this embodiment, the intake valves IN1 and the exhaust valves E2 are both dual poppet valves having an inner poppet valve 20 and an outer poppet valve 22, shown in FIG. 2. The outer poppet valve 22 is encouraged to the closed position by spring 34, and may be forced to the open position by pistons 36 in response to actuation fluid supplied by three-way control valve 38, in a preferred embodiment a three-way spool valve. With this arrangement, when the outer poppet valve 22 is opened, the inner poppet valve 20 will follow the outer poppet valve 22, though will remain closed. Thus when the outer poppet valve 22 is opened, both springs 28 and 34 are compressed. Also when the outer poppet valve 22 is closed, the inner poppet valve 20 may be independently opened through control of three-way valve 32, spring 34 being stronger than spring 28. If desired, the lift of inner poppet valve 20 could be made greater than the lift of the outer poppet valve 22 so that the inner poppet valve 20 could be opened even when the outer poppet valve 22 was open, though as shall be subsequently seen, this is not necessary with the present invention. Sealing between poppet valves and between the outer poppet valve and the housing is by way of O-rings in the O-ring grooves shown.

Actuation of the inner poppet valve 20 is powered by hydraulic piston 30 controlled by three-way valve 32, and actuation of the outer poppet valve is powered by hydraulic pistons 36 controlled by three-way valve 38. Typically but not necessarily, engine oil is used as the hydraulic fluid. Valve seat 24 is a conventional valve seat in the head of the engine and coupled to a manifold, whereas fluid communication with the inner poppet valve 20 is through ports 26 and through an opening (not shown) in the housing encircling the same.

Referring back to FIG. 1, it will be noted that the inner poppet valves of the intake valves IN1 are coupled to a source of gaseous fuel under pressure, typically compressed natural gas, though other gaseous fuels such as hydrogen may be used. The inner poppet valve 20 on exhaust valves E2 are coupled to a high pressure air rail or manifold, the air manifold typically having a significant transient storage capacity, which may be augmented by air storage tank AIR. By control of the timing of the inner poppet valve 20 in the exhaust valve E2, any cylinder may be used to compress intake air and deliver the same to the high pressure air manifold, or alternatively, the high pressure air may be injected into any cylinder to sustain combustion during a power (expansion) stroke.

Alternatively, the inner poppet valves of the intake valves IN1 can be coupled to a high pressure air rail, which may be augmented by air storage tank AIR, and the inner poppet valve 20 on exhaust valves E2 are coupled to a source of gaseous fuel under pressure.

Figure 3:
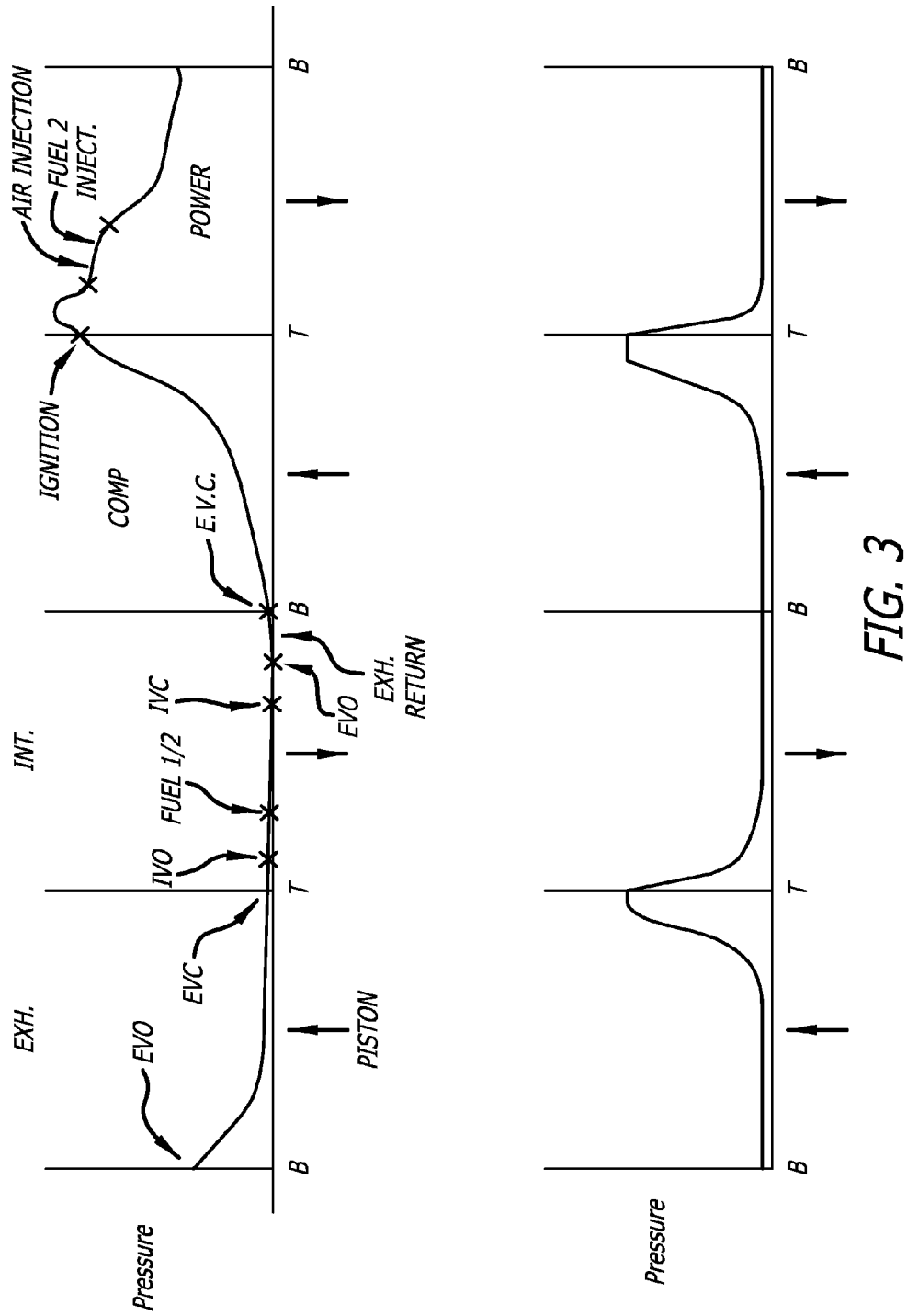
FIG. 3 presents curves illustrating exemplary operating cycles for the engine of FIG. 1.

The preferred cycle of operation for the engine may be seen in FIG. 3. Because all cylinders are the same, any cylinder may be used as a compression cylinder and any cylinder may be used as a combustion cylinder. In that regard, it is generally desirable to sometimes use any one cylinder as a combustion cylinder and then as a compression cylinder, as alternating between such use provides a more uniform temperature distribution in the engine, thereby allowing the use of a conventional engine block without any special provision for extra cooling capacity for dedicated combustion cylinders. Also in the preferred embodiment when a cylinder is used as a compression cylinder, it is used in a two stroke compression cycle, as shown by the lower curve in FIG. 3. Therefore any one cylinder may be used for a combustion cylinder approximately two thirds of the time and only used as a compression cylinder approximately one third of the time. Also it may be preferred to operate a cylinder as a combustion cylinder for at least a few seconds before switching it to use as a compression cylinder, rather that to have two combustion cycles, then two compression cycles, etc., to minimize the effect of the transitions between cylinder use as compression and combustion cylinders. In that regard, at the end of a pair of compression strokes, the residual gas in that compression cylinder will be relatively cold and oxygen rich compared to that in a combustion cylinder after a power stroke. To account for this, one could open an exhaust valve after a compression stroke when the pressure in the compression cylinder falls to that of the intake manifold, and draw in exhaust gas of combustion cylinders from the exhaust manifold to mix with the air remaining in the compression cylinder, and then exhaust the mixture at the beginning of a following four stroke combustion cycle. In any event, the first combustion cycle after compression cycles in a cylinder will require some different control than successive combustion cycles, though again, the flexibility of the engine valve and injector electronic control, together with the ability to look back to equivalent cycles to make adjustments in the control, equivalent cycle to equivalent cycle, readily compensates for these differences.

Between the bottom dead center position B of the piston and the top dead center position T of the piston, compression occurs in the compression cylinder (lower graph of FIG. 3), with the inner poppet valve of the respective exhaust valve E2 being opened when the pressure in the compression cylinder equals or is a little above the pressure in the high pressure air manifold and then closed when the piston reaches the top dead center position. Only a small valve is needed, as the volume of the air is greatly reduced by its compression. Thereafter as the piston retreats from the top dead center position, the pressure in the compression cylinder drops rapidly, and when that pressure approximately equals the pressure in the air intake manifold, one or preferably both intake valves IN1 and IN2 are opened to draw in air from the air intake manifold, with the intake valve or valves being closed when the piston reaches bottom dead center for the immediately following compression stroke.

The cycle used in the preferred embodiment for the combustion cycle may be seen in the upper graph of FIG. 3. After a combustion or power stroke, when the piston is approximately at bottom dead center, the exhaust valve opens (EVO) for a relatively conventional exhaust stroke with the exhaust valve closing (EVC) approximately at the top dead center position of the piston. Thereafter the intake valve opens again, a controlled amount of either fuel (liquid or gas, or both) is injected into the combustion chamber, then the intake valve is closed, followed by opening of the exhaust valve and then closing of the exhaust valve at or near bottom dead center position of the piston. Thus some fresh air and some fuel is drawn into the combustion cylinder and then some hot exhaust is drawn back into the combustion cylinder, after which the compression stroke begins. By proper control and adjustment of the timing of the operation of the various engine valves, compression ignition will occur at approximately top dead center position of the piston, followed first by a rise in combustion chamber pressure and temperature, and then a reduction in pressure and temperature, as the piston moves away from top dead center. The amount of fuel injected during the intake stroke is intentionally limited so that when compression ignition occurs, the temperature rise in the combustion chamber is limited to temperatures below which nitrous oxides ($NO_x$) form. When the pressure in the combustion cylinder drops to the pressure in the high pressure air rail, the inner poppet valve 20 of the respective exhaust valve E2 is opened to inject more gaseous fuel (fuel 2) into the combustion chamber, to be ignited by the still burning fuel injected during the intake stroke. Of course, if the gaseous fuel is not available (or already used or not available where the engine is being operated), the liquid fuel, typically but not necessarily diesel fuel, may be injected.

In the combustion cylinder cycle just described, the fuel injected during the power stroke after compression ignition normally would be the gaseous fuel. The fuel injected during the intake stroke could be either the gaseous fuel or the liquid fuel, such as diesel fuel, gasoline or some other suitable liquid fuel. The intake of some of the exhaust gasses near the end of the intake stroke provides a hotter charge in the combustion chamber at the beginning of the compression stroke, and thus a higher temperature on compression to achieve compression ignition, even with a gaseous fuel such as compressed natural gas, which has a substantially higher self ignition temperature than diesel fuel. In that regard, the ability to control valve timing in a camless engine allows cycle to cycle adjustments to keep compression ignition confined to the desired crank shaft angle. Thus repeatable compression ignition of a gaseous fuel can be obtained with the present invention so that the engine may be run entirely on a gaseous fuel, unlike the prior art where ignition was obtained using a liquid fuel (diesel fuel) and the gaseous fuel was ignited thereby without meaningful control of the temperature rise in the combustion cylinder.

For cold starting of the engine, it may be necessary to start the engine using a conventional four stroke diesel cycle (or a two stroke diesel cycle), and after some warm up period, change directly to exclusive use of the gaseous fuel. Alternatively, one could change first to the injection of diesel fuel during the intake stroke for compression ignition purposes, with injection of gaseous fuel during the power stroke, then followed by operation entirely on the gaseous fuel, falling back on operation of the diesel fuel for extended range of the vehicle when the supply of gaseous fuel is exhausted. As a further alternative, a cold start might be made by injecting diesel fuel during the intake stroke for ignition during the compression stroke, followed by injection of the gaseous fuel during the power stroke, then switching to operation on 100% gaseous fuel when engine operating conditions allow.

Note that combustion temperature peaks after compression ignition may be limited by limiting the amount of fuel in an oxygen rich environment, or alternatively, by limiting the amount of oxygen in a fuel rich environment during compression. A further alternative would be to provide an approximately stoichiometric ratio of fuel and air, but with relatively large component of non-reactive components (exhaust gas). As further alternatives, at idle or for low engine power requirements, no fuel may be injected during the power stroke, as all fuel necessary may be injected during the intake stroke without reaching the temperature at which $NO_X$ is formed when combustion is initiated. In any event, the amount of intake air taken in, the amount of exhaust gas returned and the amount and type of fuel injected into the combustion cylinder during an intake stroke, the amount of air and the amount and type of fuel injected into the combustion cylinder during a power stroke, and the timing of all such events, are all separately controllable to separately control ignition, combustion, the maximum temperature reached in the combustion cylinder and the output power of the engine.

Whichever approach is used, operation in a compression ignition mode solely on a gaseous fuel is possible with the present invention without the need to use diesel fuel to facilitate ignition. This allows maximum use of the gaseous fuel with reduced pollution, yet also provides extended vehicle range when needed. The availability of the extended range is extremely important from a marketing standpoint, as many purchasers would be very reluctant to buy a vehicle with the limited range of compressed natural gas, even if they rarely or never would need the extended range. Also, another advantage of the present invention is that in many cases, an existing diesel engine and engine design may be retrofitted to operate on compressed natural gas with the diesel fuel backup, thereby effectively eliminating the major source of pollution in older diesel engines by operating them on compressed natural gas, and when operating on diesel for the extended range, by operating the engines on improved operating cycles that essentially insure complete combustion and yet eliminate $NO_X$ production. Such retrofitting is far less expensive than engine replacement, which also usually leads to vehicle replacement.

In FIG. 1, an oil supply is shown for supplying oil through check valve CV2 to a pump P, which can pump oil through check valve CV3 to the oil rail to maintain the desired pressure in the oil rail and to accumulator ACC through check valve CV4 and control valve V2, or to divert excess pumping capacity through control valve V1 and check valve CV1 back to the pump inlet to allow the positive displacement pump to operate with a very low pressure differential between the pump outlet and the pump inlet. When extra engine power is desired, three-way control valve V2 is actuated to block flow through check valve CV4 toward the accumulator ACC, and to allow flow from the accumulator to the inlet of pump P. This lowers the pressure differential being pumped by the pump, reducing the power used by the pump. If the pressure in the accumulator is greater than the desired pressure in the oil rail, the pump may act as a hydraulic motor, actually adding power back to the pump drive. Thus pressurizing the accumulator ACC may add to engine braking capabilities, or allow storage for use during extra engine power boosts.

Also shown in FIG. 1 is an air storage tank AIR. The air storage tank may be used to even out the pressure surges in the air rail during normal operation of the engine. The air storage tank AIR may also be used to store high pressure air, such as during use of a vehicle engine for vehicle braking purposes. In that regard, in the prior art, a Jake Brake (a registered trademark of Jacobs Vehicle Systems, Inc.) opens exhaust valves at the end of compression strokes, thereby dissipating the energy of compression to provide engine braking. With the present invention, all cylinders may be used as compression cylinders for engine braking in two stroke cycles, doubling the engine braking function over that of the Jake Brake. In addition however, in the present invention, at or near the end of an intake stroke, the cylinder may be momentarily coupled to the air rail. This greatly raises the pressure in the cylinder, with the cylinder then using much more energy compressing the air charge to a much higher pressure than normal before being vented either to the exhaust, or first to the high pressure rail for energy storage and then to the exhaust, near or just after the piston reaching top dead center before taking in more air in the subsequent down stroke for compression. This can be used to provide many times the braking provided by a Jake Brake.

Further, one of the problems with a Jake Brake is the exhaust noise it generates. Opening exhaust valves at top dead center of compression strokes presents extraordinary high pressure pulses to the muffler system, resulting in extraordinary exhaust noise. Consequently, use of Jake Brakes in residential areas is frequently banned. With the present invention, if the exhaust valve is not opened, and the intake valve is opened only after the pressure in the cylinder drops to approximately the intake manifold pressure, no high pressure pulses are dumped to the atmosphere, so to speak. Instead, the high pressure air is coupled to the air storage tank AIR, with excess high pressure air being bled from the air tank. This presents a much easier muffling problem, as there are no high pressure pulses to deal with. Also the pressure of the air being bled will be independent of engine speed, making the noise components repeatable and allowing tuned noise suppression techniques to be used. This is not very practical with a Jake Brake, as the frequency of the pressure pulses in the exhaust is directly proportional to engine speed. Consequently the present invention may be configured to avoid use restrictions associated with Jake Brakes while providing much greater engine braking capabilities.

Figure 4:
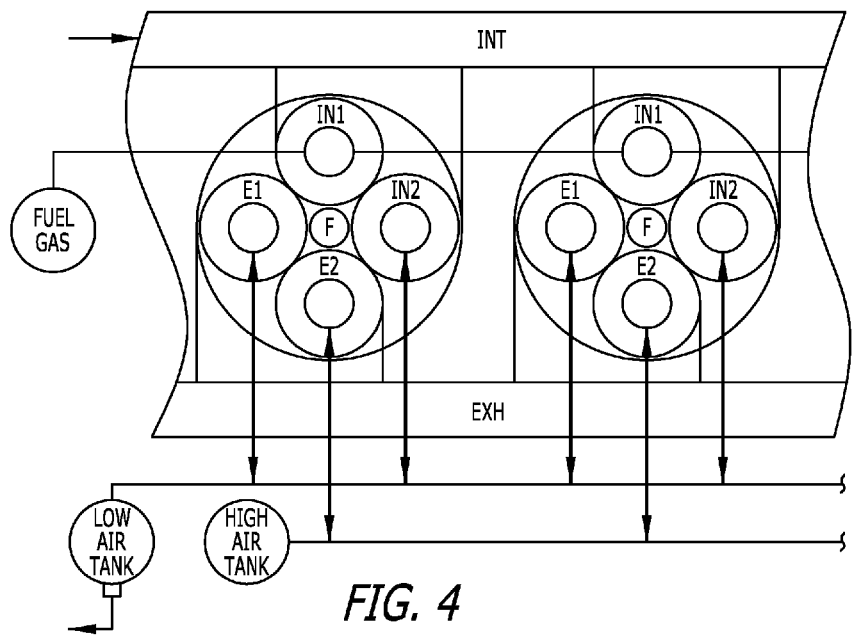
FIG. 4 is a plan view illustrating an alternate exemplary engine head configuration in accordance with the present invention.

Now referring to FIG. 4, an alternate embodiment for two typical cylinders the engine of FIG. 1 may be seen (In this Figure, certain things are only shown schematically, and the fuel rail and the oil rail supplying the fuel injectors are not shown). This embodiment may be operated in the same cycles as the embodiment of FIG. 1. However in this embodiment, all engine valves are concentric pairs, with two air storage tanks being used, namely a high pressure air tank and a low pressure air tank. The high pressure air tank is used for air injection into the combustion cylinders as previously described. The low pressure air tank stores lower pressure air, and can be used for other purposes, such as powering vehicle accessories, etc. In certain applications, the engine may be used as an air compressor for such purposes as powering spray guns, air driven tools, jack hammers, etc. by increasing the percentage of time that cylinders are used as compression cylinders as opposed to combustion cylinders, directing the compressed air to either air rail as required, and timed accordingly so that there is little pressure drop across the respective inner poppet valves. Here two inner poppet valves may be used for exhausting low pressure air into the low pressure air storage tank because of the greater volume of the low pressure air. Such an arrangement can eliminate the need for an expensive separate mobile engine powered compressor unit, allowing a vehicle engine to also serve as the mobile compressor unit when needed, and at very little increased cost. Further, making all engine valves and the engine valve drive system the same has a manufacturing cost advantage. In any embodiment, the availability of pressurized air, particularly high pressure air, can be useful in cold starts of the engine.

It is to be noted that in the foregoing description of exemplary embodiments, timing for such things as engine valve operation, fuel and air injection, etc. are described in approximate terms only, as dynamics and other effects, as well as cycle to cycle adjustments to maximize performance, may result in significant variations for the description herein.

Engines in accordance with the present invention, because they incorporate electronic control of engine valves (camless engine) and fuel injection, and include intake and exhaust valves that may be operated as in conventional compression ignition engines, may be operated using substantially any operating cycle such as those disclosed in U.S. Patent Application Publication No. 2007/0245982 published Oct. 25, 2007 and entitled "Low Emission High Performance Engines, Multiple Cylinder Engines and Operating Methods", and U.S. Patent Application Publication No. 2007-0245982 published Oct. 25, 2007 and entitled "Low Emission High Performance Engines, Multiple Cylinder Engines and Operating Methods", U.S. Patent Application Publication No. 2008-0264393" published Oct. 30, 2009 and entitled "Methods of Operating Low Emission High Performance Compression Ignition Engines" and U.S. Patent Application Publication No. 2009-0183699 published Jul. 23, 2009 and entitled "Compression Ignition Engines and Methods", the disclosures of which are hereby incorporated by reference. Either a liquid fuel or gaseous fuel may be used for any part of any injection event.

One fuel that may be used in engines in accordance with the present invention is ammonia ($NH_3$). Ammonia as a fuel has a number of advantages and a number of disadvantages. Its primary advantage is that it may be manufactured, given a source of energy and water for its manufacture, and stored and transported in reasonable safety using known technology. Another advantage is that its products of combustion are simply nitrogen and water, and thus is nonpolluting. Another advantages, in comparison to hydrogen at least, is that because of its odor, small leaks may be readily detected before any explosion risk could be encountered, though is toxic in very high concentrations. Disadvantages, at lease in some types of engines, include the fact that ammonia has a boiling point of $-33°$ C., so unless kept under pressure, it will convert to the gaseous form. It also has a critical temperature of $132.4°$ C. ($270.32°$ F., which means that above this temperature, it is a gas no matter what pressure it is under, and high pressures are required to maintain ammonia in liquid form as the critical temperature is approached. Ammonia has a relatively low flame speed, and has a high autoignition temperature of $651°$ C. This temperature is just slightly higher than the temperatures typically created by the compression stroke in a typical diesel engine with a compression ratio of between 15:1 and 20:1. Ammonia has a relatively low energy content, with three gallons of ammonia being approximately equivalent to one gallon of gasoline in energy content, or approximately 2.35 pounds of ammonia is equivalent to one pound of gasoline in energy content.

The use of ammonia as a fuel in an engine using the present invention has interesting possibilities. Part of ammonia's low energy capacity may be made up by the higher efficiency of a compression ignition engine because of its high compression ratio. Also the low flame speed in ammonia is of no consequence in compression ignition engines. Finally, because of its low boiling point, ammonia may be used as a gaseous fuel or as a liquid fuel, or alternatively, it might be used as both a gaseous fuel and a liquid fuel in engines in accordance with the present invention. For a cold start, one might start using a conventional compression ignition cycle by substantially heating the intake air and starting to inject ammonia at or near top dead center for conventional compression ignition. Once the engine is running, hot exhaust gas will be available for recirculation into the combustion cylinder during the intake stroke, so liquid or more likely gaseous ammonia may be the fuel injected during the intake stroke (see top curve of FIG. 3). If desired, the amount of ammonia injected during the intake stroke may comprise the total amount of ammonia used for the following combustion stroke, with the amount of air (oxygen) present in the combustion chamber at ignition being limited (fuel rich) to limit the peak temperature in the combustion chamber to less than that required to form $NO_x$, with the air injection after ignition sustaining combustion to consume all the ammonia in the combustion chamber during the power stroke. Note the there may be enough excess oxygen in the combustion chamber after the power stroke to initiate combustion during the next cycle without taking in more air during the intake stroke, and since all fuel may be injected during the intake stroke, the amount of fuel injected during the power stroke may also be zero.

Figure 5:
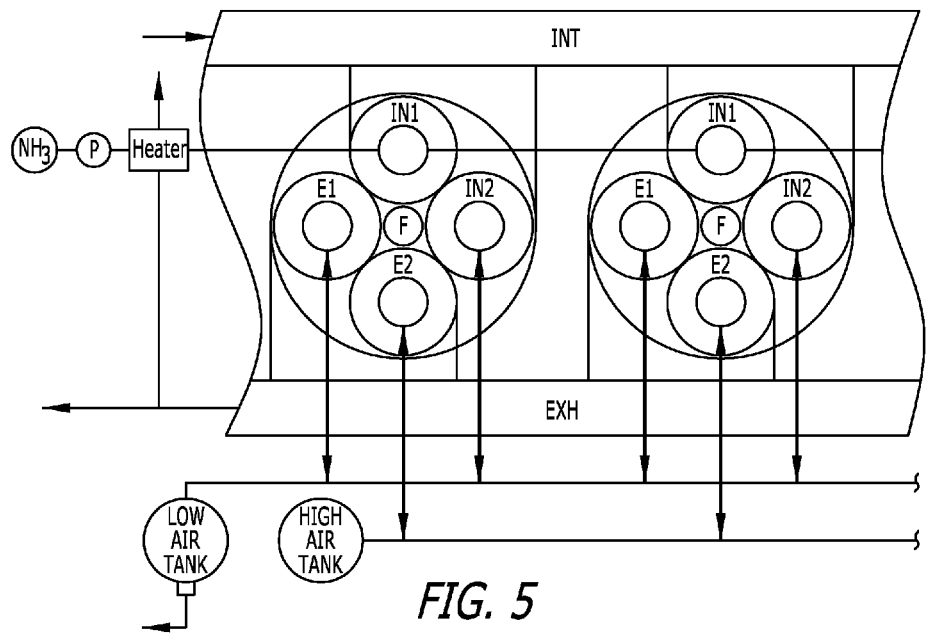
FIG. 5 is a plan view of an exemplary engine head using ammonia as the fuel or one of the fuels, and using exhaust heat to gasify the ammonia to achieve injection pressures.

Injecting liquid ammonia from an injector in the head of an engine at engine operating temperature is very difficult because of the vapor pressure of the ammonia at such temperatures, and the temperature peaking in an engine when it is shut off may make it impossible. However, it could be done with a cold engine, or alternatively the engine could be started as just described or using diesel fuel in an ordinary diesel cycle. However gaseous ammonia could be injected such as through the inner valve of engine valve IN1 during the power stroke as shown in the upper curve of FIG. 3 by heating the ammonia with exhaust gas to a vapor pressure adequate to somewhat exceed the pressure in the combustion chamber. This in essence recovers some of the exhaust gas heat by pumping a small volume of liquid ammonia by pump P of FIG. 5 to a high pressure before heating with exhaust gas heat as both a fuel and as a substantial volume of high pressure gas injected during the power stroke.

Existing engines may be converted to run as duel fuel engines in accordance with the present invention by changing the engine head(s) to engine heads incorporating one of the present invention head arrangements and preferably removing the engine camshaft.

Thus while certain preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. In an engine capable of operating on a gaseous fuel and/or a liquid fuel, apparatus comprising:
   an engine head having, for each cylinder of the engine;
      a pair of intake valves coupled to an intake manifold, a pair of exhaust valves coupled to an exhaust manifold and a fuel injector;
      a first of the intake valves and a first of the exhaust valves each having an inner valve within the respective intake and exhaust valve;
      the inner valve of one of the first intake and first exhaust valves being coupled to a source of gaseous fuel;
      the inner valve of the other of the first intake and first exhaust valve being coupled to an air storage device;
      the fuel injector being coupled to a source of liquid fuel for direct injection into each cylinder.

2. The apparatus of claim 1 wherein:
   for each cylinder of the engine;
      the inner valve of the first intake valve is coupled to the source of gaseous fuel; and
      the inner valve of the first exhaust valve is coupled to an air storage tank.

3. The apparatus of claim 1 wherein the air storage device is an air rail.

4. The apparatus of claim 1 wherein the air storage device is an air rail coupled to an air storage tank.

5. The apparatus of claim 1 wherein the engine is a multiple cylinder engine, and wherein the air storage device is coupled to the inner valve of one of the first intake and first exhaust valve for each cylinder.

6. The apparatus of claim 1 further comprised of an oil rail for providing fuel injector actuating oil under pressure to the fuel injectors.

7. The apparatus of claim 1 wherein, for each cylinder of the engine, both intake valves and both exhaust valves each have an inner valve within the respective intake and exhaust valve.

8. The apparatus of claim 7 wherein:
   the air pressure storage device is a high pressure air storage device;
   the inner valve of one of the first intake and one of the first exhaust valves being coupled to a low pressure air storage device, the low pressure storage device for storage of air at a lower pressure than the high pressure air storage device.

9. In an engine capable of operating on a gaseous fuel and a liquid fuel, apparatus comprising:
   an engine head for a multi-cylinder engine having, for each cylinder of the engine;
      a pair of intake valves coupled to an intake manifold, a pair of exhaust valves coupled to an exhaust manifold and a fuel injector;
      a first of the intake valves and a first of the exhaust valves each having an inner valve within the respective intake and exhaust valve;
      the inner valve of one of the first intake and first exhaust valves being coupled to a source of gaseous fuel;
      the inner valve of the other of the first intake and first exhaust valve being coupled to an air rail that is coupled to an air storage tank;
      the fuel injector being coupled to a source of liquid fuel.

10. The apparatus of claim 9 wherein:
    for each cylinder of the engine;
       the inner valve of the first intake valve is coupled to the source of gaseous fuel; and
       the inner valve of the first exhaust valve is coupled to the air storage tank.

11. The apparatus of claim 9 further comprised of an oil rail for providing fuel injector actuating oil under pressure to the fuel injectors.

12. The apparatus of claim 9 wherein, for each cylinder of the engine, both intake valves and both exhaust valves each have an inner valve within the respective intake and exhaust valve.

13. The apparatus of claim 12 wherein:
    the air pressure storage device is a high pressure air storage device;
    the inner valve of one of the first intake and one of the first exhaust valves being coupled to a low pressure air storage device, the low pressure storage device for storage of air at a lower pressure than the high pressure air storage device.

14. The apparatus of claim 9 wherein the engine is a camless engine.

15. A method of operating a multi-cylinder engine on a gaseous fuel and/or a liquid fuel comprising:
    operating at least one cylinder as a compression cylinder on a two stroke cycle to compress intake air;
    operating at least one cylinder as a combustion cylinder in a four stroke cycle by;
       a) during the intake stroke, taking air into the combustion cylinder, injecting one of the fuels into the combustion cylinder and taking exhaust gas into the combustion cylinder;
       b) compressing the contents of the combustion cylinder during a compression stroke following the intake stroke of a) to initiate combustion by compression ignition at or near the end of the compression stroke;
       c) injecting the gaseous fuel and intake air compressed by the cylinder operating as the compression cylinder into the combustion cylinder during the power stroke following the compression stroke of b);
       d) exhausting the contents of the combustion cylinder during an exhaust stroke following the power stroke of c); and
       e) repeating a) through d).

16. The method of claim 15 wherein the fuel injected in a) is the gaseous fuel.

17. The method of claim 15 wherein the fuel injected in a) is the liquid fuel.

18. The method of claim 15 wherein the fuel injected in a) is diesel fuel.

19. The method of claim 15 wherein the fuel injected in a) is sometimes the gaseous fuel and sometimes the liquid fuel.

20. The method of claim 15 wherein in c), the fuel injected is sometimes the liquid fuel and is sometimes the gaseous fuel.

21. The method of claim 15 wherein the fuel injected in a) is liquid ammonia.

22. The method of claim 15 wherein the fuel injected in a) is gaseous ammonia.

23. The method of claim 15 wherein the fuel injected in c) is gaseous ammonia.

24. The method of claim 15 wherein the multi-cylinder engine is a camless engine.

* * * * *